US008156004B2

(12) United States Patent
Wajihuddin (10) Patent No.: US 8,156,004 B2
(45) Date of Patent: Apr. 10, 2012

(54) METHOD, SYSTEM AND APPARATUS FOR USERS TO BUILD AND USE DIGITAL PRODUCTS AND FOR ADVERTISERS TO COMMUNICATE WITH USERS IN A MANNER THAT DOES NOT MITIGATE USER EXPERIENCE

(75) Inventor: Nasir Wajihuddin, New York, NY (US)

(73) Assignee: Skyworks Ventures Inc., Jamesburg, NJ (US)

( * ) Notice: Subject to any disclaimer, the term of this patent is extended or adjusted under 35 U.S.C. 154(b) by 490 days.

(21) Appl. No.: 11/842,641

(22) Filed: Aug. 21, 2007

(65) Prior Publication Data

US 2008/0313038 A1 Dec. 18, 2008

Related U.S. Application Data

(63) Continuation-in-part of application No. 11/818,951, filed on Aug. 21, 2006, now abandoned.

(51) Int. Cl.
G06F 17/60 (2006.01)

(52) U.S. Cl. .......................................... 705/14.5; 463/31

(58) Field of Classification Search ...................... 705/14
See application file for complete search history.

(56) References Cited

U.S. PATENT DOCUMENTS

| | | | |
|---|---|---|---|
| 6,473,720 B1 | 10/2002 | Hampson | |
| 6,758,746 B1 | 7/2004 | Hunter | |
| 7,729,946 B2 | 6/2010 | Chu | |
| 2004/0043806 A1* | 3/2004 | Kirby et al. | 463/6 |
| 2004/0143495 A1 | 7/2004 | Koenig | |
| 2004/0143852 A1 | 7/2004 | Meyers | |
| 2004/0193441 A1* | 9/2004 | Altieri | 705/1 |
| 2005/0216346 A1* | 9/2005 | Kusumoto et al. | 705/14 |
| 2006/0052891 A1 | 3/2006 | Ikeda et al. | |
| 2006/0105841 A1* | 5/2006 | Rom et al. | 463/42 |
| 2006/0135232 A1* | 6/2006 | Willis | 463/1 |
| 2007/0043616 A1* | 2/2007 | Kutaragi et al. | 705/14 |

(Continued)

FOREIGN PATENT DOCUMENTS

WO WO 00/67473 11/2000

(Continued)

OTHER PUBLICATIONS

Bashford, Suzy. "The Revolution Masterclass on in-game advertising". Revolution. London: Apr. 2006. p. 82, 3 pgs.*

(Continued)

Primary Examiner — Gabrielle McCormick
(74) Attorney, Agent, or Firm — Leason Ellis LLP (57) ABSTRACT

Serving targeted advertisements to a user within a virtual environment. The virtual environment is displayed to the user on a client and enables selection of components for use within the virtual environment. Component selections, associated with one or more attributes are obtained from a user, and a custom product, which is interactively navigable and has a set of interactivity characteristics, is constructed by combining the component selections. A condition within the virtual environment triggers a set of events, and an advertisement, concerning a product component, is served to the user in response and in accordance with a comparison of ad-serve parameters and information associated with the component selections. The custom product can be selectively modified in response to any user interaction with the served advertisement, and its interactivity characteristics accordingly modified. Performance ratings and comparisons thereof can be computed based on the customized product or alternatively customized product.

19 Claims, 4 Drawing Sheets

U.S. PATENT DOCUMENTS

| | | | |
|---|---|---|---|
| 2007/0061204 A1* | 3/2007 | Ellis et al. | 705/14 |
| 2007/0072676 A1* | 3/2007 | Baluja | 463/42 |
| 2008/0102947 A1* | 5/2008 | Hays et al. | 463/31 |

FOREIGN PATENT DOCUMENTS

| | | |
|---|---|---|
| WO | WO 2004/042525 | 5/2004 |
| WO | WO 2005/086969 | 9/2005 |

OTHER PUBLICATIONS

Website: www.racelinemotorworks.com/design.html, Copyright 2007 (printed Jun. 5, 2009).

* cited by examiner

METHOD, SYSTEM AND APPARATUS FOR USERS TO BUILD AND USE DIGITAL PRODUCTS AND FOR ADVERTISERS TO COMMUNICATE WITH USERS IN A MANNER THAT DOES NOT MITIGATE USER EXPERIENCE

This application claims priority under 35 U.S.C. §120 as a continuation-in-part application of U.S. patent application, entitled "Method, System and Apparatus for Users to Build a Use Digital Products and for Advertisers to Communicate with Users in a Manner that Does Not Mitigate User Experience," filed concurrently herewith, which is a conversion of from Provisional Patent Application Ser. No. 60/839,017, entitled "Method, System and Apparatus for Users to Build a Use Digital Products and for Advertisers to Communicate with Users in a Manner that Does Not Mitigate User Experience," filed Aug. 21, 2006. The entire disclosure of each of the aforementioned priority applications is hereby incorporated by reference.

FIELD OF INVENTION

The present invention relates the serving and targeting of advertisements to a user in an online environment, and more particularly relates to the service and targeting of advertisement in a virtual environment without disrupting the user's experience in the virtual environment.

BACKGROUND

The advent of online content has provided businesses and advertising agencies with a multitude of new opportunities to reach potential customers with advertising. Such companies have typically tried to adapt traditional methods of advertising to the online environment. Thus online advertisements resemble billboards, newspaper or magazine ads, and radio and television ads. Furthermore, online content has adapted its presentation to accommodate such advertisements, thereby creating a defacto standard.

For example, online newspaper content is typically formatted to accommodate an advertisement having a standard shape and size (e.g., a banner ad). In this way companies and advertising agencies can maximize the return on their investment in creating an ad by ensuring that the standard size and shape ad can be placed with multiplier suppliers of online content.

A further category of online advertisement is the "pop-up" ad (i.e., an advertisement that opens in a new web browser window). For example, when a user visits a certain web-page, a new browse window will open and display an advertisement on top of the content of the visited webpage. Thus, the pop-up ad typically obstructs the user's display of the online content being viewed and disrupts the user's experience and interaction with that content.

Advertisements can be static and non-interactive such that viewing the advertisement provides the viewer with additional details regarding the service or product advertised, or creates an impression on the viewer in an effort to associate a positive opinion with the advertised product in the viewer's mind. Alternatively, because online content can link from one source to another (e.g., by hyperlink), advertisers can embed or display ads in online content that link to a provider of the advertised product or service.

Various revenue models have been developed and are used in association with advertising in online content. For example, a Pay-per-Impression model, (i.e., Cost-per-Thousand), the advertiser pays for the exposure of their message to a user. In a Pay-per-Click model, an advertiser pays the content provider for each time a user clicks on the advertiser's advertisement and is redirected to the advertiser's website. In a further example, in a Pay-Per-Action model, the advertiser only pays the online content provider when a user follows the advertisement link and completes a transaction with the advertiser (e.g., purchases an item or registers with a website).

In the increasingly competitive advertising market, advertisers have employed various methods to entice the user and capture the user's attention. These methods include the addition of graphics, animation and audio content. Some advertisers include miniature games or trivia questions to grab the user's attention.

Advertisers also target the advertisement to the viewer of the online content, such that the advertisement is more likely to concern a product that would interest the viewer. Targeting can be accomplished in several ways. One possibility is to gather information regarding the user's preferences through a questionnaire or user profile that is established by the user when accessing or registering for the online site. These preferences are used to determine the types of products and services in which the user might be interested and serve advertisements directed to those products and services to the user. Alternatively, advertisers can attempt to determine the services and products the user might be interested in based on the content of the online site. For example, if the user is viewing a web page for viewing stereo components the advertiser may present an advertisement directed towards a specific speaker manufacturer or an online music store.

In addition, to the online print-type media discussed above, advertisers are also expanding targeted advertisements into online media, including games, music and video. Demographics are typically used to target the advertisements to the particular media based on research into the preferences of users who consume such media. However, interaction with the advertisement is typically disruptive to the online experience that the user. For example, a user may be required to watch a video advertisement before being presented with the video desired. Similarly, and as used by broadcast radio, audio advertisements can be inserted before, after, or during the presentation of audio media.

Thus, traditional methods of online advertising and targeting are disruptive to the user's online experience and interaction with the content. What is needed in the art is a way to integrate advertisements into online content seamlessly without disrupting the user's online experience, and preferably augmenting the user's experience. Further, interaction with online advertisements should preferably provide feedback that is integrated into the online experience.

SUMMARY OF INVENTION

In accordance with one aspect of the present invention, a method for serving ads to a user within a virtual environment is provided. A portion of the virtual environment is displayed to the user on a device, which is connectable to a network so as to communicate with the virtual environment. The virtual environment is accessible through a network and includes components which are available for selection for use within the virtual environment. Component selections are obtained from a user in accordance with a rule base. Each component is associated with one or more attributes. The component selections are combined to construct a custom product having a set of interactivity characteristics, which affect the behavior of the product in the virtual environment. The user can interactively navigate the custom product within the virtual environment. If a condition within the virtual environment occurs, a set of events is triggered. Ad-serve parameters are compared to information associated with the component selections, and advertisements are served to the user in response to the triggered events. Each advertisement preferably concerns a real-world product component and is served in accordance with a result of the comparing step. In response to any user interaction with the served advertisement, the custom product can be modified to include a component selection which represents the real-world product, and the interactivity characteristics of the product are changed based on any modification.

In a further aspect of the present invention, a method for increasing gamer awareness of an advertiser's in a virtual gaming environment is provided. A customizable product in the virtual gaming environment is associated with a gamer and comprises one or more components each having a set of performance attributes, such that the customizable product has a resultant set of performance characteristics based on the sets of performance attributes. Virtual offers are provided from a sponsor to the gamer. Each virtual offer is preferably associated with a component which has a set of performance attributes having respective values and is available for use in the virtual gaming environment. A selection of one of the provided offers is received, and the customizable product associated with the gamer is modified to include the component associated with the selected offer, such that the customizable product has a modified resultant set of performance characteristics. The modified product can be navigated within the virtual gaming environment. A first performance rating is computed based on the modified resultant set of performance characteristics, and a second performance rating is computed based on the resultant set of performance characteristics. The comparative performance of the first and second performance ratings can then be reported.

In yet a further aspect of the present invention, a server for hosting a multi-user, online, user-navigable virtual environment configured to serve advertisements to users is provided. The server includes: a network adaptor for connecting to one or more clients, each client associated with a user of the virtual environment; a data storage system for storing data concerning the virtual environment; a processor; and a computer readable medium encoded with a computer program. The server transmits at least a portion of the virtual environment to a client associated with a particular user. The server can further obtain component selections, each being associated with one or more attributes, from the particular user in accordance with a rule base. A custom product having a set of interactivity characteristics affecting behavior of the product in the virtual environment as a function of the associated attributes is constructed by combining the obtained component selections. Navigation data can be received from the client in response to user interaction, and a condition within the virtual environment can trigger a set of events. Ad-serve parameters are compared to information associated with the component selections, and advertisements concerning a real-world product component can be served to the user in accordance with a result of the comparing step and in response to the triggering events. Interaction with the served advertisement by the particular user at the client enables a selective modification of the custom product to include a component selection which represents the real-world product, which changes one or more of the interactivity characteristics of the product component based on any modification of the custom product.

In yet a further aspect of the present invention, a client for displaying at least a portion of a virtual environment to a user and assisting in the targeting of advertisements to a user of the client, is provided. The client includes: a network adaptor for communicating with a server providing the virtual environment over a network; a display for displaying the portion of the virtual environment provided by the server over the network; a user-input device for receiving user interaction with the virtual environment; a processor; and a computer readable medium encoded with a computer program that is executable on the processor. The computer program is configured to receive data concerning the virtual environment, the data including display data, component data, and attribute data associated with the component data. A portion of the virtual environment is displayed on the client based on the received data. Component selections are obtained from the user to construct a custom product which has interactivity characteristics based on the attribute data associated with the selected components. User-interaction with the custom product is responded to by manipulating the custom product in the virtual environment, and advertiser-targeting-information, including user-interaction data, is communicated by the client to server. A targeted advertisement is received by the network adaptor and stored. Each advertisement preferably concerns a real-world product-component and is served in accordance with the advertiser-targeting-information. The portion of the virtual environment displayed is analyzed to determine a placement of the targeted advertisement, and the targeted advertisement is placed in accordance with the determined placement. In response to any user interaction with the placed advertisement, the user is permitted to selectively modify the custom product to include a product-component selection which represents the real-world product. Based on any modification of the custom product, one or more of the interactivity characteristics of the custom product are updated.

These and further aspects, features and advantages of the present invention will become more apparent from the following detailed description when taken in connection with the accompanying drawings which show, for purposes of illustration only, a preferred embodiment of the present invention.

DETAILED DESCRIPTION OF CERTAIN EMBODIMENTS

By way of overview introduction, in accordance with one aspect of the present invention, the user can connect to a virtual environment, such as a massive multi-player online role playing game (MMORPG), a simulated world, a casual game, or a casual online multi-player game and be exposed to targeted advertisements that integrate with the virtual environment and provide interactive feedback. For example, a user can connect to a virtual environment in which he or she can navigate an automobile through the environment, visit various sites and experience driving the selected automobile. The user can select a particular car that has a real-world counterpart, and further customize the car by selecting various components or options which are included in the virtual model of the car.

The user's choice of selected components has certain attributes which will determine the automobile's performance characteristics within the environment. Preferably these performance characteristics are modeled after the real world products represented and their characteristics. As the user navigates the automobile within the environment, the user can be presented with advertisements, which are preferably targeted toward this specific user. One technique for targeting advertisements within such an online environment is to examine the user selected components used to construct or customize the car. For example, if a user experiences slippage on the road during a rain storm in the virtual environment or a tight turn, the user may be presented with an advertisement for tires which have enhanced gripping performance. Optionally, the advertisement can be integrated into the virtual world as a billboard on the roadside or a television or radio commercial playing in the background.

The advertisements, which concern the real-world product, are preferably interactive and allow the user to select the advertisement. Upon selection, the user can be provided with additional information concerning the product (e.g., the tires) and the opportunity to customize the car being navigated with the product. By selecting the advertised product the performance characteristics of the car are changed. Thus, during the next rain storm or tight turn that the user encounters in the virtual environment, the user can experience a simulation of driving the car with the new tires.

In a further example, if the user drives a predetermined number of miles (e.g., 3,000 miles) the user may be presented with an advertisement for an oil change service. Thus the user is exposed to online advertisements and is provided with the opportunity to incorporate the products and services that are the subject of those advertisements into their experience in the online environment. By experiencing this simulation, users may be encouraged to purchase the product or service in the real world.

Figure 1:
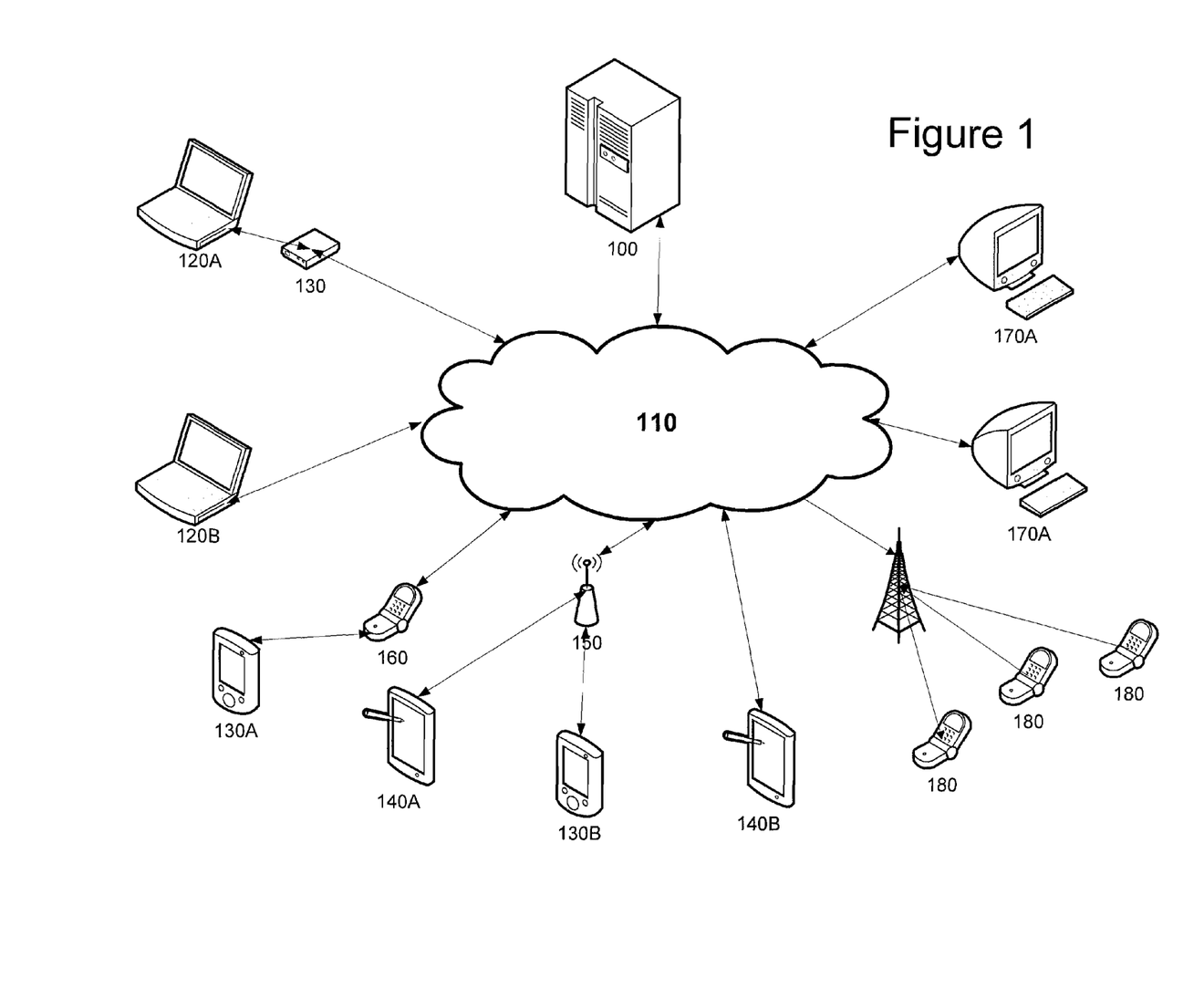
FIG. 1 illustrates an embodiment of a communication network over which the present invention can operate.

With reference now to the Drawings, FIG. 1 illustrates a network over which a virtual environment can be provided. A server 100 posts the online environment and provides data concerning the environment over network 110 to the various clients that participate in the online environment, the server 100 preferably includes a network adapter for accessing and communicating with clients over the network 110, a data storage system such as a database or hard drive for storing data concerning the virtual environment and a processor for simulating the environment and performing calculations required thereby.

While FIG. 1 illustrates a single server 100, it would be known to one ordinary skill in the art that multiple servers 100 could be used to serve the virtual environment in a distributed environment. Further, specific server tasks can be assigned to different machines. For example, the advertising subsystem (i.e., process) can execute on one or more dedicated servers 100. Optionally, the advertising subsystem can execute on a server 100 owned and operated by a third party (i.e., a machine not affiliated with the company hosting the online environment), as discussed below.

Multiple clients can connect to the server 100 over network 110 using various communication hardware, software and protocols (proprietary or standardized). For example a laptop 120(a) can connect to the server through a cellular modem 130. Alternatively, a laptop 120(b) can connect to the server 100 through the network 110 by Ethernet or other wired or wireless device. Personal computers, such as terminals 170 and 170(b), can also communicate with the server 100 and access the virtual environment through network 110. Access to the virtual environment can be provided to laptops 120(a) and (b) and personal computers 170(a) and (b) using a browser (e.g., web browser) or a proprietary or licensed program developed to receive and display data concerning virtual environments.

Additionally, clients to the virtual environment can include various devices that are commonly referred to as thin clients. For example, tablet PCs 140(a) and 140(b) can access the virtual environment through a wireless network connection such as a wireless access point 150. Further, a personal digital assistant 130(a) can connect to the server 100, for example, over a cellular modem 160, and cell phones 180 can connect to the server 100 hosting the virtual environment over cellular network tower 190. Each of these clients can access the environment through a web browser type device or software program coded specifically for accessing the environment.

While FIG. 1 illustrates certain types of clients which can connect to the virtual environment hosted by server 100, it would be known to one of ordinary skill in the art that any device having a network connection, a display, and a user input device can be used to access the environment.

Figure 2:
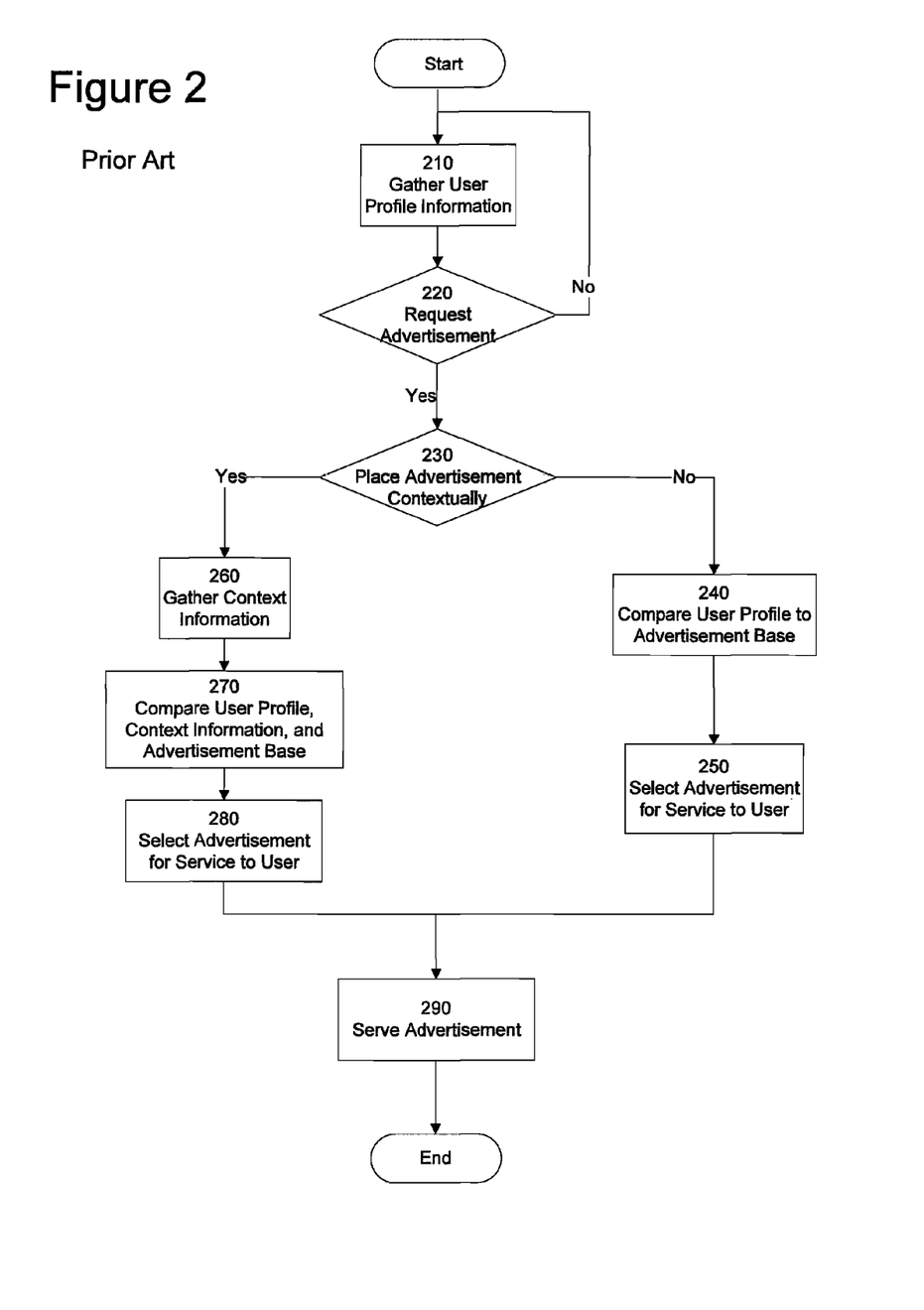
FIG. 2 depicts a flow diagram illustrating a process by which targeted ads can be served.

FIG. 2 illustrates a process 200 that is known in the art by which advertisements are served in an online environment, such as a newspaper-based web page or other text based medium. Information about the user viewing the page is gathered at step 210. Advertisement place holders are typically embedded in the online content. When such a place holder is viewed by a user, an advertisement request is triggered at step 220. The client will transmit and the server will receive a request for an advertisement. If no such ad request is triggered at 220, the user can continue to browse the online content, and the server can optionally continue to gather user profile information at step 210. If an advertisement place holder is viewed, the advertisement request is triggered at step 220 and an advertisement request is sent to and received at the server. The server then determines whether the advertisement should be placed contextually at step 230. This determination can be made by examining the request or the web page from which the request was directed. If the request is not for a contextual advertisement, at step 240 the server will compare the user profile to an advertisement rule base. The advertisement rule base typically contains an association of advertisements to preferences or other indicators of user's interest. Once the comparison at 240 is completed, the results of the comparison are used to select an advertisement.

Alternatively, if at step 230 it is determined that the advertisement is to be served contextually, the server will gather context information from the online content currently being viewed by the user at step 260. The server can then compare the context information gathered and the advertisement rule base at step 270 to select an advertisement at step 280. The comparison at step 270 can optionally include information from the user profile to enhance the accuracy of the targeted advertisement. Once the advertisement has been selected at either step 280 or step 250 the advertisement is served to the user at step 290. That is, the advertisement is presented to the user as an embedded advertisement, pop-up advertisement or other type of online advertisement known in the art.

Figure 3:
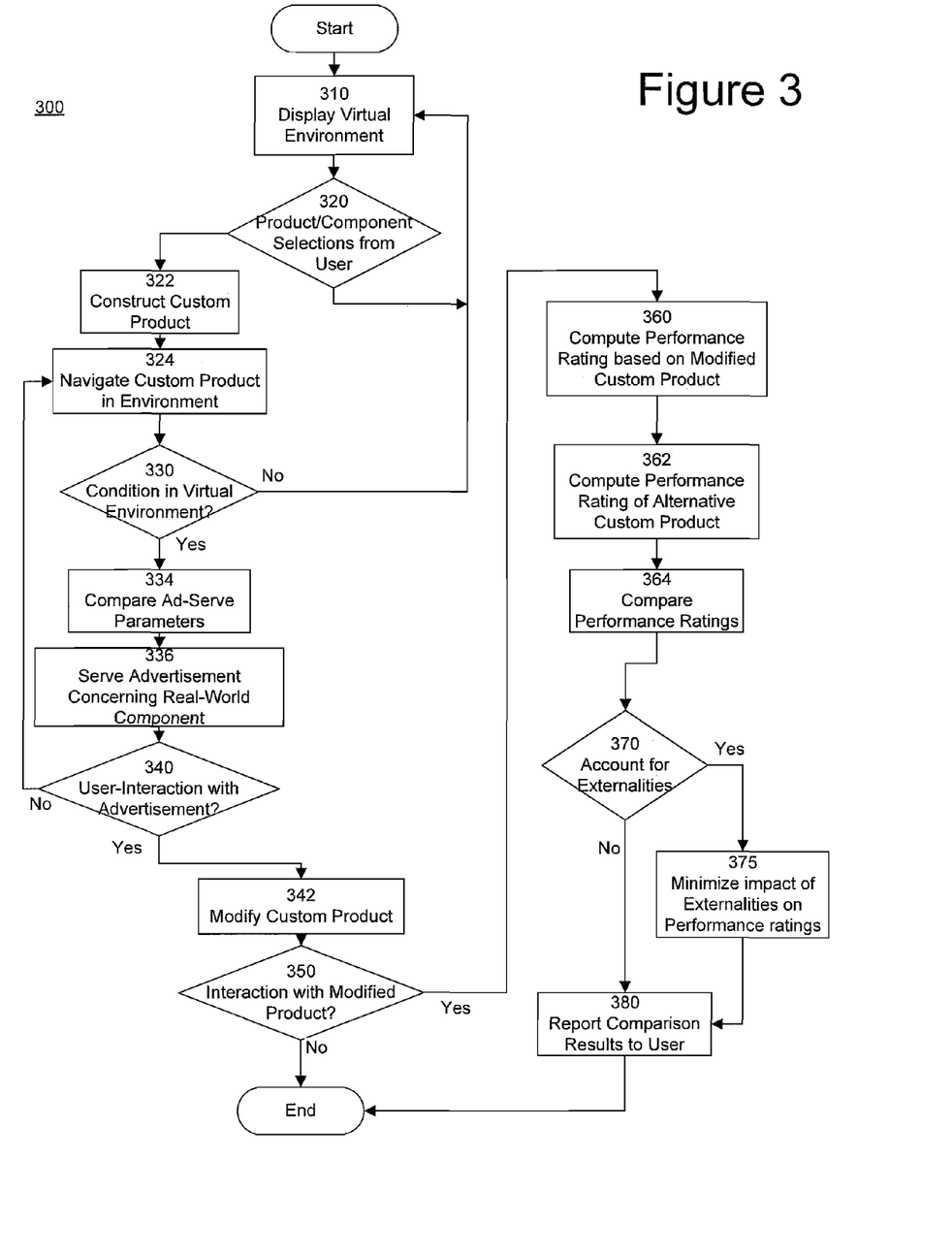
FIG. 3 depicts a flow diagram illustrating a process for serving advertisements in a virtual environment in accordance with an embodiment of the present invention.

An online virtual environment, such as the one hosted by server 100, provides a rich environment for serving and targeting advertisement to users. FIG. 3 illustrates a process 300, which in accordance with one aspect of the present invention, provides a method for targeting advertisement to users within a virtual environment. At step 310, a portion of the virtual environment is displayed to the user, preferably through a web browser or proprietary interface to the virtual environment executing one of the clients of the virtual environment. For example, data concerning the surroundings of the user in the environment can be transmitted to personal computer 170(*a*) which processes and renders the data into a visual display of the environment. Alternatively, the server 100 can render the image data and transmit graphical data, such as images, or streaming media to a client, such as cell phone 180, which is then displayed to the user through a browser on the client. Distributing images from the server 100 to the client reduces the processing requirements of the client, but increases the load on the server 100. In a further alternative the server 100 can send a hybrid of data and media to the client. That is, the server can transmit media (e.g., images and video) that represent various views of the virtual environment in conjunction with positional information concerning the user's coordinates, field of view, and heading (i.e., vector) in the virtual environment. The client can then use the positional information to determine which portions of the media to graphically transform and present to the user through the browser.

The user can interact with a wide variety of items in the virtual environment. For example, the user can interact with a car, a computer, a building, a computer, a toaster, or another user. These items, including the user herself (e.g., the user's appearance), can be customized or constructed in accordance with the users selections. The properties of the item can determine or influence the outcome of the user's interaction with the item. For example, a virtual representation of a user can be injured in a car crash if the car is not equipped with seatbelts. In a further example, a user's interaction with another user can be influenced if the user customized her virtual representation by wearing a political shirt with which the other user agrees.

At step 320 the system determines whether the user has selected components of a product for use within the virtual environment. The selection of components can include the selection of a product having default components or required components. For example, a user can select a particular model car which includes required components that can not be changed, such as the chassis, and default components such as stock tires components that were selected by the user as well as default components and/or required components. Alternatively, a custom product can be composed entirely of user selected components or default components. If no such selection is made the user can continue to navigate the environment, and various portions of the environment are displayed to the user at step 310. If the user selects components for customization at step 320, then a custom product is constructed at step 322.

Each component of the product can have certain attributes including performance attributes. The attributes of the component which comprise the custom product can be analyzed to determine the interactivity characteristics of the custom product. For example, returning to the example of a user navigating an automobile through a virtual environment, a user can create a customized car by selecting the various components of the car, including specifying a particular engine, particular tires, and particular windshield wipers. If desired the system can constrain the selection of the components based on the already selected components of the product. For example, if a user selects 15 inch wheels, the system can prevent a user from selecting tires that only fit 17 inch wheels. In a further example, the user can be prevented from selecting a particular type of brake pads if the car is equipped with drum brakes.

The determination of interactivity characteristics can include a recordation of the characteristics of the individual components. However, more commonly, a particular interactivity characteristic of the custom product can depend on the attributes of multiple components. For example, the acceleration rate of a car depends on multiple components including the power of the engine, the size of the wheels, the aerodynamics of the frame, the total weight of the car, and others. Further, the interaction of the characteristics of the various components can result in frustration of various interactivity characteristics. That is, increasing the value of one performance variable may increase the performance of the product up to a certain point, at which a further increase can reduce performance. Furthermore, the enhancing of one performance characteristic can result in a decrease of another performance characteristic.

For example, the weight of car and the power of the engine will affect how quickly the car can accelerate. As the weight of the car decreases, the car can attain better acceleration. However, if the car is too light, the engine can be too powerful for the car and cause the car to spin its wheels rather than accelerate, thus negatively impacting the car's performance. Furthermore, decreasing the weight of the car can increase acceleration, however, it will also decrease friction on road surfaces and therefore decrease the car's handling in turns.

Once the components are selected to construct the custom product and the interactivity characteristics of the product are determined at step 322, the user can navigate the custom product in the virtual environment at step 324. User interaction in the virtual environment is preferably transmitted to the server to monitor activities in the environment.

An advertisement is served when a condition is met within the virtual environment at step 330. There are various types of conditions that can occur within the virtual environment. One such condition can be based on the properties of the virtual environment itself. For example, if it is raining within the virtual environment a condition may be satisfied which prompts service of an advertisement related to rain. Alternatively, a condition can be based on a user's actions. That is, if a user performs, or does not perform, a specified action a condition within the environment can be met. In yet a further alternative, a condition can be a hybrid or combination of environment properties and user actions.

If no such condition is met at step 330 the user can return to step 320 where the virtual environment is displayed and the user can continue to navigate the virtual environment and perform optional modifications and customization of the product being navigated. If, however, a condition is satisfied in the virtual environment, at step 330 a set if events can be triggered at step 332 in response to the satisfaction of the condition within the virtual environment.

The series of events triggered preferably includes initiating the service of an advertisement. However, the set of events triggered at 332 can include an inquiry into other properties of the environment or the custom product being navigated by the user as well as causing a further change to the virtual environment. For example, if it is raining in the virtual environment and the user loses traction with the road, the car can be caused to crash, and an ambulance dispatched.

At step 334 ad-serve perimeters are compared to information associated with the components selected to construct the custom product. Ad-serve parameters can include information about the advertisements available for service such as type of products, target demographic, related products and preferred frequency of display. Further, with respect to the preceding example, the system can analyze various aspects of the car and the triggered series of events to determine which advertisement to serve. For example, in the above scenario, it may be appropriate to serve and advertisement concerning tires that perform better in the rain. However, if the user has already selected those tires, the system can serve an advertisement concerning safety features such as seatbelts and air bags. In a further alternative, if the user does not have medical insurance, the comparison results can be used to select an advertisement for medical insurance or a particular doctor.

The advertisements are then served to the user at step 336. The advertisements can be served by the server 100 hosting the virtual environment. Alternatively, advertisements can be served by a third party, in cooperation with the online environment host. That is, the server 100 can provide the necessary information, such as user profile and required environment conditions, to a third party which contracts with other service providers and businesses to advertise in the virtual environment. The third party can then analyze the information received from the server 100 and determine which advertisement of its clients would best be suited for this user. Thus, the company hosting the virtual environment can out-source the advertising subsystem, and is therefore not required to act as the advertising agency. Rather, the online environment can sell advertising space to one or more third parties, which can then directly advertise in the online environment, or re-sell the space to other businesses.

Advertisements can also be stored on the client, for example cached (e.g., in the browser or a temporary storage location). Alternatively, advertisements can be stored in a database local to the client for retrieval upon service. The cache or database can be updated when initiated by a client or server communication (i.e., push or pull), or periodically updated based on a predetermined schedule. The advertisement server can then serve the ad to the client by directing the client to retrieve a specific ad from its cache or database. Further, if the advertisement decision service is executing on the client, the client can retrieve the appropriate or selected advertisement from its local storage.

The advertisement served to the user is preferably interactive. If the user interacts with the advertisement at step 340, the user is preferably provided with the opportunity to modify the custom product at step 342 with the component advertised. The component and advertisement preferably concern a real-world component having its own attributes and performance characteristics. Thus, by modifying the custom product at step 342, the interactivity characteristics of the custom product are changed based on the modifications made. The user can then interact with the modified custom product and navigate it in the virtual environment.

If the user interacts with the modified custom product, the system can compute a performance rating of the modified custom product at step 360. The performance rating is preferably measured in a manner consistent with the type of product. For example, with reference to an automobile, the performance rating of a car can be measured in relation to horsepower, torque, or acceleration rate.

The system can compute the performance rating of an alternatively customized, or further customized, product at step 362. For example, the system can compute the performance rating of alternative configurations to determine a custom product having enhanced performance, either overall or with respect to particular attributes. Alternatively, the system can maintain a history (e.g., database or data log) of previously constructed custom products. Using this history, the performance rating of the alternatively customized product can include the original custom product (i.e., the custom product before it was modified) can be computed at step 362.

At step 364, the performance ratings of the original custom product and the alternative modified custom product are compared. The computation of various performance ratings is generally order independent and is illustrated in FIG. 3 in accordance with one aspect of the present invention.

The performance rating is preferably computed in a manner consistent with the manner in which the product is used (i.e., navigated) in the virtual environment. For example, the performance rating can be computed based on the interactivity characteristics of the custom product. Alternatively, it can be based on the custom product's actual performance in the virtual environment while under user-control. That is, if the performance rating is computed based on the interactivity characteristics, the interactivity characteristics are preferably converted into a user-readable format, which can then be used to gauge the performance of the custom product. However, if the performance rating is computed based on an actual performance within the virtual environment while the product is under user control, the system can monitor the navigation of the custom product throughout the virtual environment, and measure various aspects of its performance.

If performance is measured as the custom product is navigated through the virtual environment, various externalities can impact the performance rating of the product. For example, a user may not optimally navigate through the environment. That is, with reference to an automobile, a user may brake too quickly or accelerate too slowly thereby impacting the performance rating calculations. Externalities can also be encountered in the virtual environment by the conditions therein. For example, rain, wind, or ice can impact the performance of an automobile.

It can be desirable to determine a performance rating that accounts for externalities such as the user's performance (e.g., driving habits). However, it can also be desirable to determine a performance rating that minimizes or eliminates the effect of the user's performance.

At step 370, the system can determine whether the performance rating should account for the externalities that may be present. If externalities are to be accounted for, at step 375 the system can minimize the impact of those externalities on the performance rating. This minimization can be achieved through the various methods known in the art. For example, the system can normalize the user's performance, and adjust the performance rating accordingly. Alternatively, the performance rating can be adjusted based on a comparison with the theoretical optimum performance rating. Other methods known in the art for reducing the influence of one or more variables on a rating can be used to account for the externalities in the virtual environment.

At step 380, the performance ratings can be reported to the user. Optionally, the results of the comparison can be reported to the user. The report can include a graphical display or text-based indicator of the performance rating or the relative performance rating of the modified custom product to the original custom product.

In practice, the user can repeatedly navigate the virtual environment and modify the custom product in response to advertisements presented in the environment. The system preferably tracks the number of impressions a particular advertisement, or advertiser, has with a particular user. In this manner, the system can ensure that the user is exposed to a variety of advertisements or advertisers. Further, the system may determine that after a predetermined number of impressions, if the user has not interacted with the advertisement, the user is not interested in the product or service, and a different advertisement may more effectively influence the user.

The above discussion illustrates a method and system, in accordance with the present invention, for targeting advertisements to a user in the virtual environment. As virtual worlds expand their user base and the number of users increases, servers become increasingly burdened by the processing required to host the virtual environment and serve necessary data to clients in a responsive, timely fashion. In accordance with one strategy to accommodate an increasing user base, and the corresponding increase in the number of clients, processing is preferably off-loaded from the server to the clients. The processing capacity of the client can prohibit certain aspects of the virtual environment and advertisement-targeting process from being performed on the client. However, the more robust the processing power of the client, the greater the distribution of work from the server to the client can be achieved. Relatively light-weight clients, such as cell phones 180, have limited capacity to absorb processing tasks, but personal computers 170 can absorb substantially processing intensive tasks.

Figure 4:
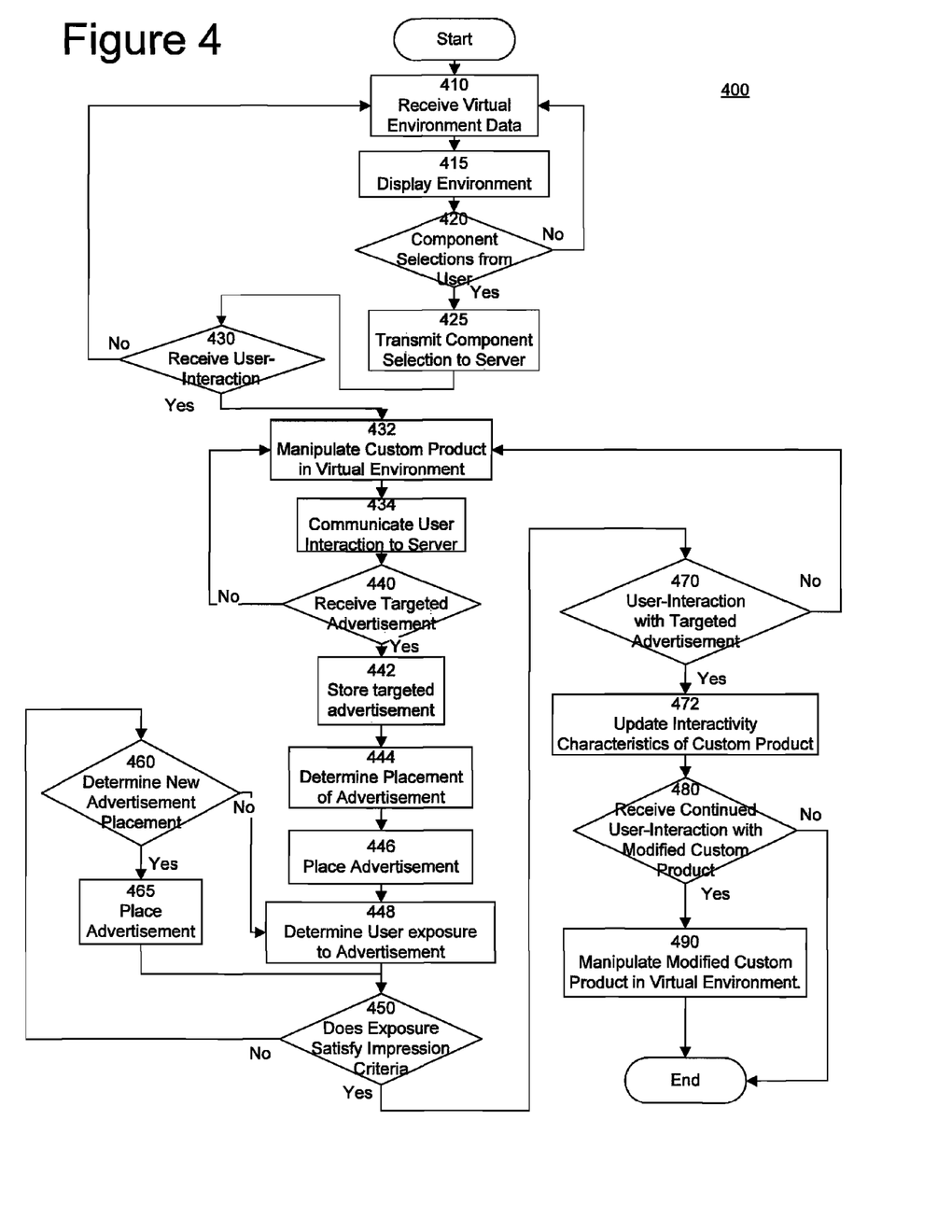
FIG. 4 depicts a flow diagram illustrating a process executing on a client in accordance with an embodiment of the present invention.

FIG. 4 illustrates a process 400 by which, in accordance with one aspect of the present invention, certain functions of the server are distributed to the client. Specifically, process 400 illustrates a method by which the client determines and displays the impact of user navigation in the virtual environment and further determines the type and placement of advertisements within the virtual world. Additional and alternative functions can also be distributed to the client using similar communication patterns.

At step 410, the client receives virtual environment data from the server. That data is displayed on the client at step 415. As discussed above with respect to FIG. 3, the data can include image or multi-media data, as well as graphical data which must be rendered on the client.

The user can select various components to generate the custom product at step 420. If no such components are selected, the user can continue to navigate the virtual environment, which is received and displayed at steps 410 and 415 respectively. If product component selections are made by the user, the selections are transmitted to the server at step 425. The custom product can be generated by either the server or the client. Preferably, the server records the specific components selected for future processing or simulation. Once the custom product is generated, it is available for user-interactive navigation.

As the user interacts with the custom product through a user-interface, the client reflects the navigation indicated by the user interaction. Optionally, the client can process the manipulation of the custom product and reflect such interaction in the display. The user interaction is preferably communicated to the server at step 434. As discussed above with respect to FIG. 3, at step 330, the system determines whether a condition in the virtual environment has been satisfied. If a condition has been satisfied, the server can proceed through the steps discussed above to select an advertisement targeted to the user, optionally based on the user interaction with the custom product, and serve that advertisement to the client. At step 440, if the client has received a targeted advertisement, it preferably stores the advertisement at step 442.

There are commonly multiple places in the virtual environment which can serve as an advertising platform to the user. For example, in a virtual world, a billboard or street sign can be used to display an advertisement. Alternatively, an audio track (e.g., a virtual broadcast from radio station) playing in the background of the virtual environment, can be used as an advertising platform. The client can analyze the portions of the virtual environment which it has received and are in user's field of view. Based on this analysis, at step 444, the client can then determine where and in which medium to place the advertisement and place the advertisement at step 446.

Advertisements can be associated with certain requirements which must be satisfied for the service of the advertisement to qualify as an impression. Various parties including the purchaser of the advertisement, the advertising agency, the party serving the advertisement, or the supplier of the product or service being advertised can define these impression related requirements. Additionally, because revenue for the company hosting the virtual world is typically associated with each advertisement impression, the host of the virtual environment can be motivated to increase the number of impressions to a user in order to increase revenue from the advertiser.

Thus, at step 448, the client preferably tracks the user's exposure to the advertisement (i.e., the time during which the advertisement is in the user's field of view or audio track). At step 450, the client can determine whether the user exposure meets the impression criteria associated with the advertisement. As the user navigates through the virtual environment, the portion of the environment which is occupied by the advertisement may no longer be in the field of view of the user. The client can determine, at step 460, whether it is necessary to place the advertisement in a new location in order to satisfy the impression criteria, for example if the advertisement is not in the user's field of view for a sufficient period.

If no new advertisement placement is necessary, for example, if the advertisement is still in view of the user, the client can continue to track user exposure to the advertisement, and re-evaluate the impression criteria, optionally accumulating advertisement impressions. However, if the impression criteria is not satisfied, and the advertisement is not in view, then at step 460 the client can determine a new location for the advertisement, and place the advertisement in its new location at step 465. Thus, the client can continue to accumulate user exposure time in order to satisfy (and maximize) the impression criteria.

An advertisement can progress from one medium to another as necessary in order to satisfy the impression criteria. For example, if no suitable print advertisement location is available to display to the user, a print advertisement can become a video advertisement or an audio advertisement. Specifically, if a user in a virtual environment is riding in a taxicab, and the user's field of view is out the window of the taxicab, an advertisement can be placed a billboard outside the taxicab. However, if the user turns his head in the virtual environment, thus changing his field of view, the billboard and advertisement would no longer be visible to the user. The client can analyze the new field of view of the user, and determine whether alternative advertising space is available within the taxicab. If the billboard is no longer in view of the user, the client can load an audio advertisement, which is associated with the print advertisement, and play the audio advertisement over the radio of the taxicab. Similarly, a user reading a virtual newspaper in which an advertisement is placed, may put down the newspaper before the impression criteria are satisfied. In this scenario, a video advertisement corresponding to the print advertisement may be placed on a television within the new view of the user in the virtual environment. This process of shifting locations of advertisements or medium of advertisements can be repeated until impression criteria are satisfied, thereby increasing the revenue associated with serving advertisements. Further, the process can be used to increase the number of impressions of the advertisement to the user.

In accordance with a further aspect of the present invention, the client can compare the impression requirements of a particular advertisement, the current field of view of the user, and the vector or predicted movement of the user to determine a preferred placement of the advertisement. For example, a particular advertisement requires an 8 second exposure to qualify as an impression. The client can examine the movement of the user and the topography of the virtual environment to determine that at the given speed the user is driving on a road and the forward distance to a curve in the road, the advertisement will not be viewed for the required time if placed in the user's current field of view. Rather, the client can determine a placement of the advertisement after the curve that is more likely to qualify as an impression.

As discussed above with respect to FIG. 3, after the user is presented with the advertisement, the user can interact with the targeted advertisement. For example, if the advertisement is a billboard, the user can click on the billboard. Alternatively, if the advertisement includes an audio component, the user can interact with the virtual radio playing the advertisement. If, at step 470, the user chooses not to interact with the advertisement, the user can continue to navigate the virtual environment, as indicated at step 432.

However, if the client receives user-interaction with the advertisement, the client can update the interactivity characteristics of the custom product at step 472 based on the selections made by the user. Optionally, at step 480, the user can interact with the modified custom product and thereby navigate the virtual world at step 490. Further, the user can obtain performance measurements and comparisons as discussed above with respect to FIG. 3.

While certain features of the present invention have been described as occurring on a particular machine (e.g., the server or the client), it would be understood by one of ordinary skill in the art that the functions described herein can be performed by various machines, interconnected, and distributed over a network. The determination of which machines perform specific functions is determined by the specific software implementation and supported hardware platforms. Accordingly, the present invention can operate in a centralized environment, wherein the server is responsible for substantially all processing, and the clients display the virtual environment and communicate user-interaction to the server. Alternatively, the present invention can also be practiced in a peer-to-peer environment having little or no centralized processing, wherein the state of each client is shared with its peers as necessary and the simulation of the virtual environment is distributed across the peer network.

While the present invention has been described with respect to certain embodiments thereof, the invention is susceptible to implementation in other ways and manners which are still within the spirit of the invention. Accordingly, the invention is not limited to the described embodiments but rather is more broadly defined by the recitations in the claims appended thereto and equivalents of the recitations therein.

We claim:

1. A server for hosting a multi-user, online, user-navigable virtual environment and configured to serve advertisements to one or more users, the server comprising:
 a network adaptor for connecting to one or more clients, each client associated with a user of the virtual environment, the environment being rendered by code and including one or more mediums which each serve as an advertising platform;
 a data storage system for storing data concerning the virtual environment;
 a processor; and
 a computer readable medium encoded with a computer program executable on the processor so as to:
  transmit at least a portion of the virtual environment to a client associated with a first user,
  obtain component selections from the first user in accordance with a rule base, each component being associated with one or more attributes;
  construct a custom product by combining the obtained component selections, the constructed product having a set of interactivity characteristics affecting behavior of the product in the virtual environment as a function of the associated attributes;
  receive navigation data concerning the custom product from the client in response to user interaction by the first user;
  trigger a set of events in response to a condition within the virtual environment other than navigation due to user interaction by the first user, the condition being at least one of an environmental property and a user action by the first user within the virtual environment;
  compare ad-serve parameters to at least information associated with the component selections;
  serve first advertisement to the first user in a first medium in response to the triggering step, the first advertisement concerning a real-world product component and being served in accordance with a result of the comparing step;
  in response to any interaction with the first advertisement by the first user at the client, selectively modify the custom product to include a component selection which represents the real-world product;
  change one or more of the interactivity characteristics of the product component based on any modification of the custom product;
  evaluate impression criteria associated with an exposure time of the first advertisement;
  based on a determination that the first medium is no longer suitable, determine a second medium in which to place a second advertisement if the evaluated impression criteria is not satisfied, the second advertisement having the exposure time of the first advertisement; and
  place the second advertisement in the second medium if the evaluation is that the evaluated impression criteria is not satisfied in order to maximize an impression on the first user,
  wherein the first medium and the second medium are different than one another.

2. The server of claim 1, wherein the advertisements are served to the first user within the virtual environment.

3. The server of claim 1, wherein the information associated with the component selections is stored in a rule base.

4. The server of claim 1, wherein the set of events is triggered in response to user interactivity by the first user.

5. The server of claim 1, wherein the computer program is further configure to analyze the interactivity characteristics with respect to an advertiser-defined set of interactivity characteristics, and wherein the triggering step is at least partially in response to the analysis.

6. The server of claim 1, wherein the information associated with the compared component selections includes the attributes associated with components available for selection.

7. The server of claim 1, wherein the computer program is further configured to:
 store data concerning any served advertisements with which the first user has interacted; and select a further advertisement in response to an analysis of the stored data.

8. The server of claim 1, wherein the server is operated by a first service provider, and the served advertisements are selected and provided to the server by a second service provider.

9. The server of claim 1, wherein at least one of the first medium and the second medium include at least two advertisement placeholders for at least one of the first advertisement and the second advertisement selected from the group consisting of print, video and audio advertisement placeholders.

10. The server of claim 1, wherein the determination that the first medium is unsuitable comprises analyzing a field of view of the first user to determine that the first medium is not in the field of view.

11. The server of claim 1, wherein the computer program is further configured to:
compare the evaluated impression criteria, a field of view of the first user, and at least one of a vector and a predicted movement of the first user; and
based on the comparison, determine a preferred placement of at least one of the first advertisement and the second advertisement.

12. A client for displaying at least a portion of a virtual environment to a user and assisting in satisfying an impression count of a one or more advertisements to a user of the client, the client comprising:
a network adaptor for communicating with a server providing the virtual environment over a network, the environment being rendered by code and including one or more mediums which each serve as an advertising platform;
a display for displaying the portion of the virtual environment provided by the server over the network;
a user-input device for receiving user interaction with the virtual environment;
a processor; and
a computer readable medium encoded with a computer program executable on the processor so as to:
receive data concerning the virtual environment, the data including display data, component data, and attribute data associated with the component data,
display a portion of the virtual environment based on the received data,
obtain one or more component selections from the user to construct a custom product, the custom product having interactivity characteristics based on the attribute data associated with the selected components,
respond to user-interaction with the custom product by manipulating the custom product in the virtual environment,
communicate advertiser-targeting-information to the server, the advertiser-targeting-information including user-interaction data to the server,
store a first advertisement received by the network adaptor, the first advertisement concerning a real-world product-component and served in accordance with the advertiser-targeting-information,
analyze the portion of the virtual environment displayed to determine a first medium in which to place the first advertisement,
place the first advertisement in the first medium,
in response to any user interaction with the first advertisement that has been placed in the first medium, permit the user to selectively modify the custom product to include a product-component selection which represents the real-world product;
update one or more of the interactivity characteristics of the custom product based on any modification of the custom product;
evaluate impression criteria associated with an exposure time of the first advertisement that has been placed in the first medium;
based on a determination that the first medium is no longer suitable, determine a second medium in which to place a second advertisement if the evaluated impression criteria is not satisfied, the second advertisement having the exposure time of the first advertisement; and
place the second advertisement in the second medium if the evaluation is that the evaluated impression criteria is not satisfied in order to maximize an impression on the user,
wherein the first medium and the second medium are different than one another.

13. The client of claim 12, wherein the computer readable medium is further encoded so as to compare advertiser-presentation-preferences associated with at least one of the first advertisement and the second advertisement with the portion of the virtual environment displayed to the user so as to optimize the determined placement.

14. The client of claim 13, wherein the comparison further includes the user-interaction data.

15. The client of claim 12, wherein the placement of at least one of the first advertisement and the second advertisement includes an auditory component.

16. The client of claim 12, wherein the computer readable medium is further encoded so as to determine a plurality of placements, and at least one of the first advertisement and the second advertisement is placed in one or more of the determined placements based on an analysis of advertiser-presentation-preferences associated with the at least one of the first advertisement and the second advertisement and the portion of the virtual environment displayed to the user.

17. The client of claim 12, wherein at least one of the first medium and the second medium include at least two advertisement placeholders for at least one of the first advertisement and the second advertisement selected from the group consisting of print, video and audio advertisement placeholders.

18. The client of claim 12, wherein the determination that the first medium is unsuitable comprises further analyzing the portion of the virtual environment displayed to determine that the first medium is not within the portion of the virtual environment displayed.

19. The client of claim 12, the computer readable medium is further encoded so as to:
compare the evaluated impression criteria, the portion of the virtual environment displayed, and at least one of a vector and a predicted movement of the user; and
based on the comparison, determine a preferred placement of at least one of the first advertisement and the second advertisement.

* * * * *